Patented May 4, 1937

2,079,489

UNITED STATES PATENT OFFICE 2,079,489

RECLAIMING OF RUBBER

Robert M. Cole, Bryn Athyn, Pa.

No Drawing. Application March 30, 1936,
Serial No. 71,683

4 Claims. (Cl. 18—52)

This invention relates to the reclaiming of rubber or constituents of rubber from waste rubber products such as the shoes of tires, tubes and other rubber products.

Heretofore the methods employed have involved the use of solvents or chemicals singly or combined. Such processes are not only uneconomical but degrade the rubber. The loss in solvents is heavy and in addition the air is deficiated, introducing health and fire hazards.

The primary object of my invention is to provide a process for reclaiming which is economical and which does not degrade the materials.

More particularly I propose to reclaim the rubber by a process which, in contradistinction to the chemical processes heretofore employed, may be termed a physical disintegration process wherein the rubber is brought out of physical phase with the undesired constituents substantially without degradation, in the sense that they may be readily separated if desired.

In the best form of the invention known to me I bring the materials out of such physical phase by heat and pressure in a water environment.

In carrying out this form of the invention, I prefer to reduce the rubber products to suitable size, as by chopping in a cutter. The chopped material is then placed in an autoclave which may be of any desired construction. In this connection I prefer to use an autoclave in the form of a horizontally disposed forged, cylindrical, steel tube closed at one end and having a quick opening head at the other end. An iron, wire-mesh basket somewhat of the nature of a cartridge, carries the charge and is inserted through the head end of the autoclave. Preferably sufficient water is run in to cover the charge.

Temperature and pressure in the autoclave is determined by the form or forms in which it is desired to reclaim the rubber. For certain purposes, I find temperatures of approximately 350° C. (corresponding pressure about 200 atmospheres per sq. in.) are suitable. Thus, for example, if it be desired that the rubber content of the waste should be substantially disintegrated or de-polymerized down to the diterpene stage, the optimum temperature is in the region of 350° C. On the other hand, where it is desired that the rubber content be retained mainly in the polymerized state, the optimum temperature is in the region of 300° C. (corresponding pressure about 1300 lbs. per sq. in.). Where the aim is to produce the volatile diterpene products, these may be removed from the loading material by releasing them with the water at the end of the operation, all as liquid phases, or by volatilizing them with the steam into suitable condensing systems. In a case where it is desired to retain the rubber content in the polymerized state, the water is released at the end of the operation as liquid or vapor and the solid, made up of the rubber phase and the loading material phase, removed from the cartridge for subsequent separation if desired, which can be readily effected as by the use of a solvent, followed by filtering. Where it is desired to reincorporate the rubber in new stock, it is not necessary to separate the loading material therefrom. Any cellulosic material such as is present in automobile tires, will be found to be readily removable if desired.

The products obtained when operating around 350° C. are useful in paints, inks, hard rubber and brake shoe linings by way of example. For paints the product is directly mixed with usual paint solvents such as turpentine, linseed oil, benzol and the like. For inks, the product is directly mixed with the ink vehicle, such as lithol varnishes. For hard rubber, the product may be repolymerized and vulcanized.

The product obtained when operating around 300° C. is useful for mechanical rubber goods, such as belting, mats and the like. It is revulcanized for these purposes.

For tires and similar articles, I operate at about 250° C. (corresponding pressure about 600 lbs. per sq. in.). The product is revulcanized for these purposes.

At 350° C. the product is soft; at 300° C. it is of an intermediate hardness; and at 250° C. is relatively hard. In all cases, any fabric present is charred.

The main factors influencing the nature of the products obtained are the temperature and with it the pressure. Time may also be an influencing factor, and by varying these two factors extensive variation in the degree of disintegration and the kind and degree of constituents obtained. The usual time factors lie within one hour at the prescribed temperature; preferably within thirty minutes, although, in some cases, some extension of the time may be desirable. So exact and controllable are the conditions of temperature pressure and time where the herein described water environment is used that almost any optimum set of conditions may be maintained for producing a maximum of any desired constituents of the rubber. Trial will readily determine the best conditions for obtaining any constituent or a maximum of any constituent.

I have found by this process that the yields in loading material and rubber substances are approximately theoretical; over 90% of the dry weight, weighed in.

As to quality, full identification of the possible individuals obtained is too exhaustive to be set forth herein, but from a comparative standpoint, with other processes working through this temperature range, disintegration is largely in the nature of degradation whereas in the present process degradation is absent. This apparently anomalous situation is probably due to the protecting influence of the water environment at these severe temperatures, otherwise so destructive, the water being maintained as such by operating at the corresponding pressure.

This application is a continuation in part of my co-pending application, Serial No. 673,025.

What I claim is:

1. In the reclaiming of rubber from waste rubber products, the step of subjecting the rubber product while immersed in water, to a temperature of from about 250° C. to about 350° C., and under a pressure corresponding to the temperature to maintain the water as such.

2. In the reclaiming of rubber from waste rubber products, the step of subjecting the rubber product while immersed in water, to a temperature of about 350° C. and under a corresponding pressure to maintain the water as such.

3. In the reclaiming of rubber from waste rubber products, the step of subjecting the rubber product while immersed in water, to a temperature of about 300° C. and under a corresponding pressure to maintain the water as such.

4. In the reclaiming of rubber from waste rubber products, the step of subjecting the rubber product while immersed in water, to a temperature of about 250° C. and under a corresponding pressure to maintain the water as such.

ROBT. M. COLE.